United States Patent [19]

Behrens

[11] Patent Number: 4,791,826

[45] Date of Patent: Dec. 20, 1988

[54] GEARSHIFT KNOB JOINING ARRANGEMENT

[75] Inventor: William L. Behrens, Troy, Mich.

[73] Assignee: Chrysler Motors Corporation, Highland Park, Mich.

[21] Appl. No.: 122,871

[22] Filed: Nov. 19, 1987

[51] Int. Cl.$^4$ .......................... G05G 1/06; G05G 9/12
[52] U.S. Cl. .................................... 74/473 R; 74/523; 74/543; 403/358; 403/359; 403/361; 403/379
[58] Field of Search ..................... 74/473 R, 523, 543; 403/358, 289, 359, 361, 379, 378

[56] References Cited

U.S. PATENT DOCUMENTS

| | | | |
|---|---|---|---|
| 3,256,031 | 6/1966 | Fillweber | 403/359 X |
| 3,673,777 | 7/1972 | Weber | 403/359 X |
| 4,598,606 | 7/1986 | Foggini | 74/473 R X |
| 4,617,834 | 10/1986 | Foggini | 74/543 X |

Primary Examiner—Allan D. Herrmann
Attorney, Agent, or Firm—Edward P. Barthel

[57] ABSTRACT

An arrangement for readily joining a plastic handgrip knob to a metal gearshift rod in a positive non-slip manner. The handgrip includes a plastic core member molded with an axial blind bore defining a linear key therein extending a predetermined axial distance from the upper terminus at the bore closed end to its lower terminus spaced from the bore open end. The junctures of the key sides with the internal surface of the bore define a pair of fillets coextensive with the key with the fillets being tapered from a maximum chordal distance at the key lower terminus to minimum chordal distance at the bore closed end. The rod is formed with a keyway extending from the rod upper end a predetermined distance sufficient to receive the key therein. The keyway junctures between its sides and the rod cylindrical surface define a pair of linear sharpened cutting edges adapted to deform and cut their associated fillets thereby tightly wedging and joining the plastic key in the keyway obviating relative rotational movement therebetween. The core member includes a pair of integral apertured leaf springs adapted to snappingly engage the ends of a rod crosspin to axially retain the handgrip on the rod.

3 Claims, 4 Drawing Sheets

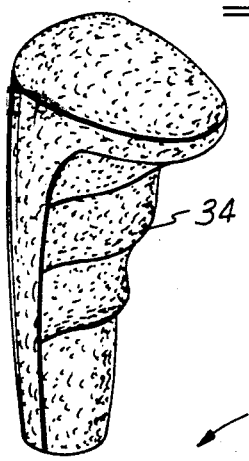
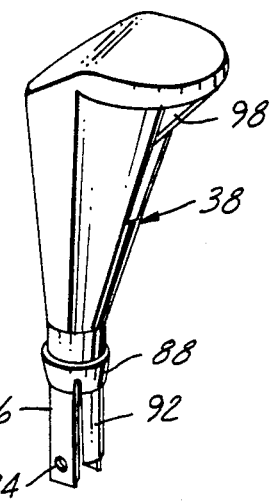
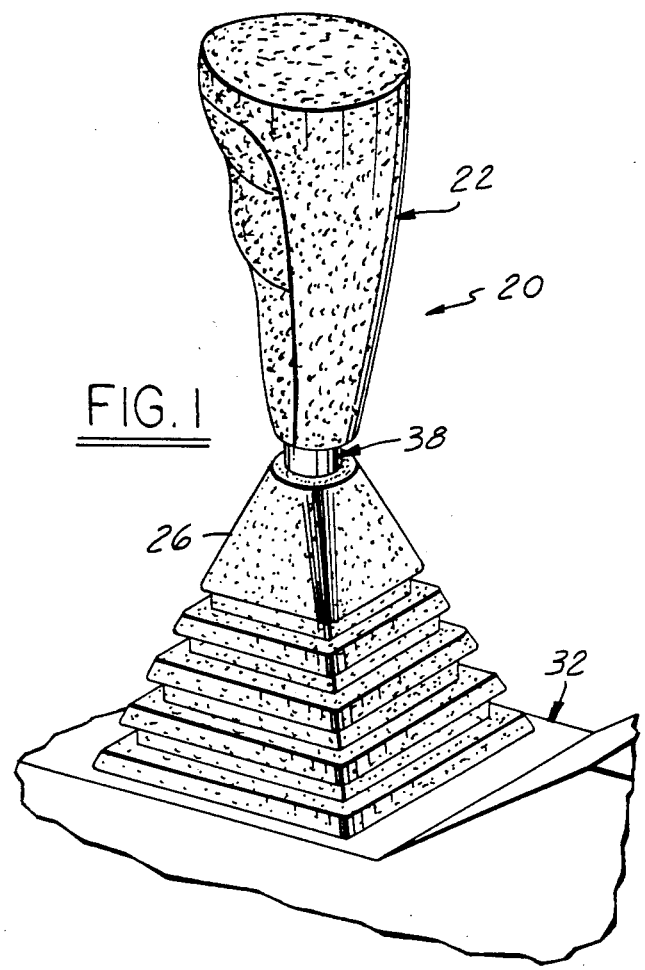
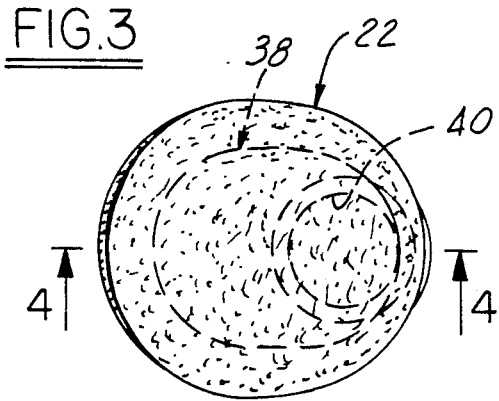
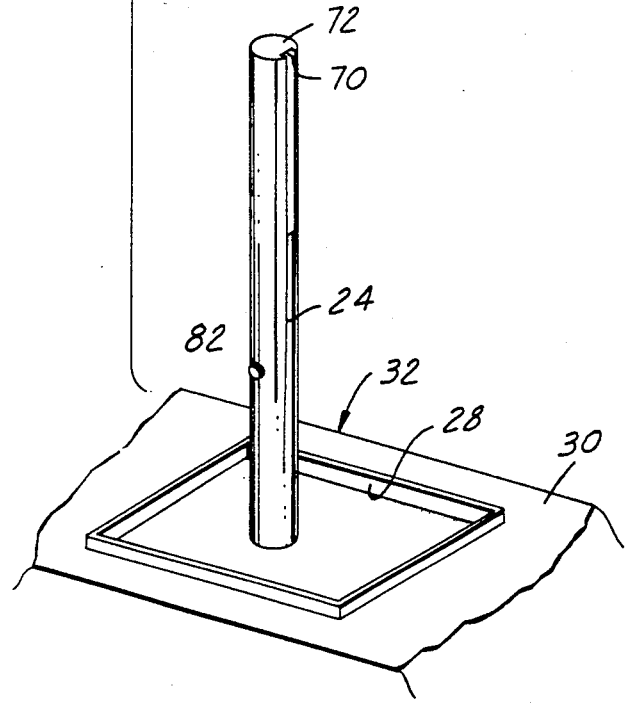

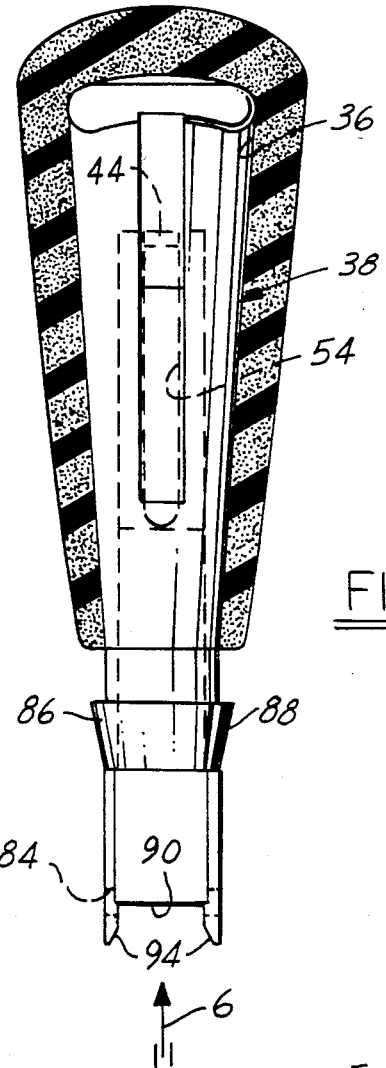
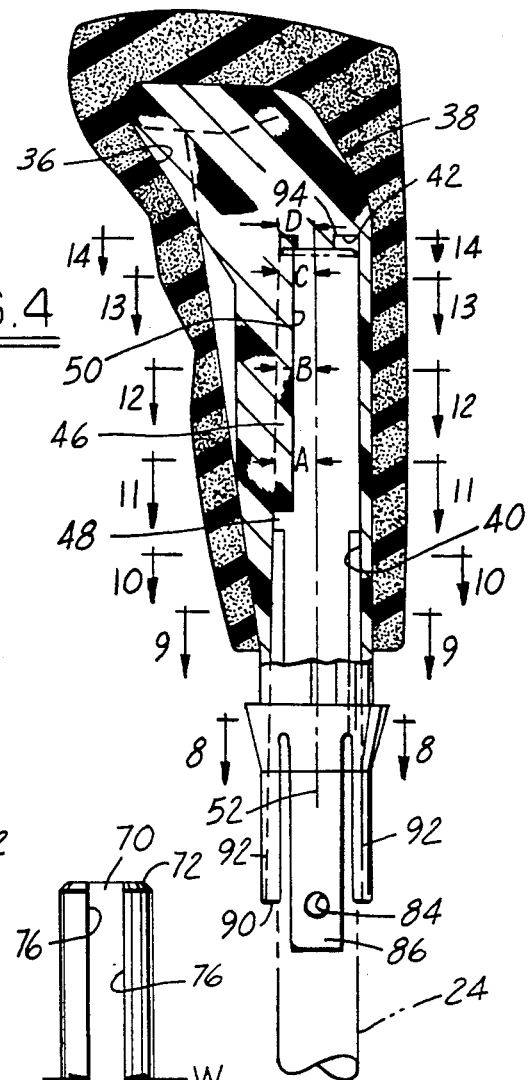
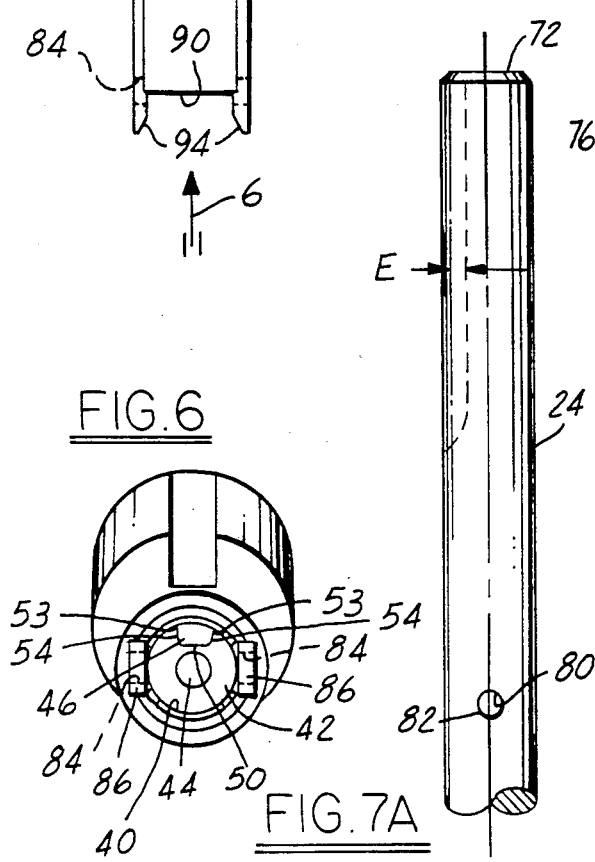
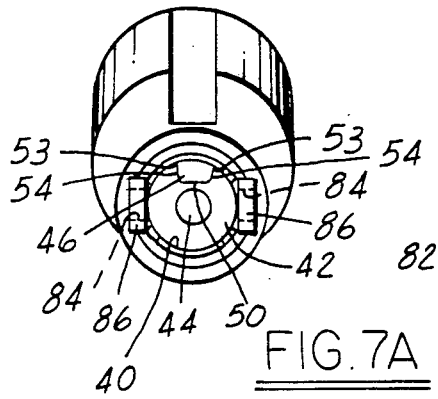
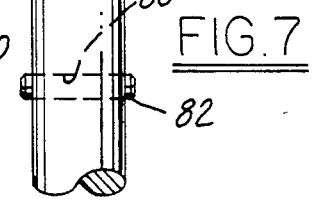

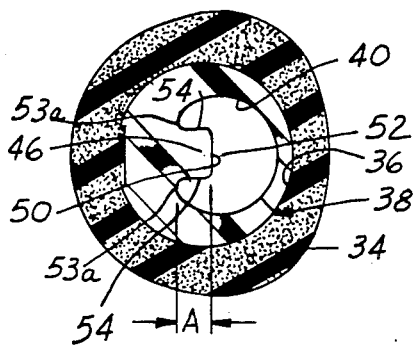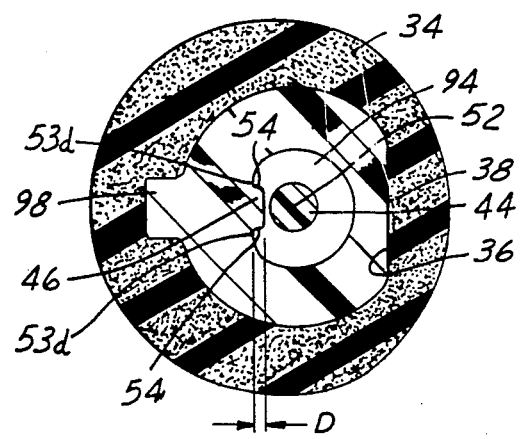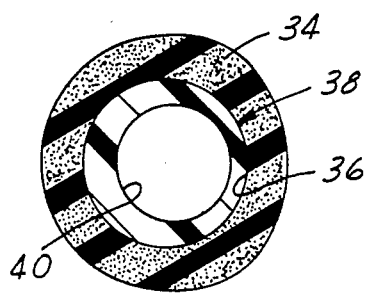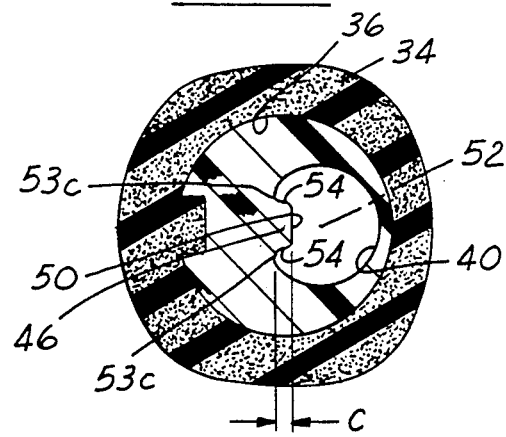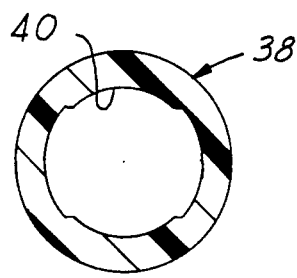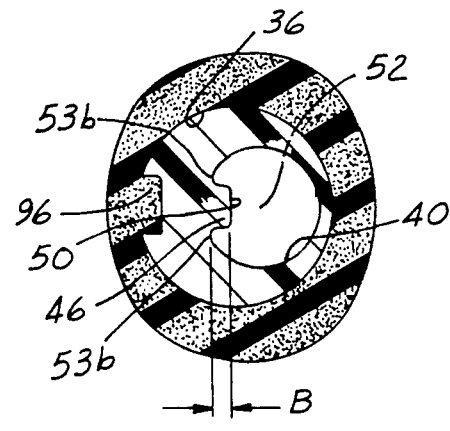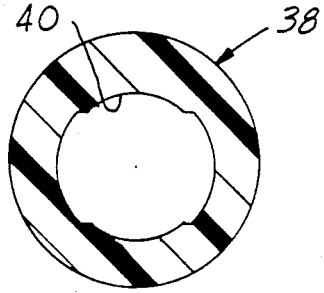

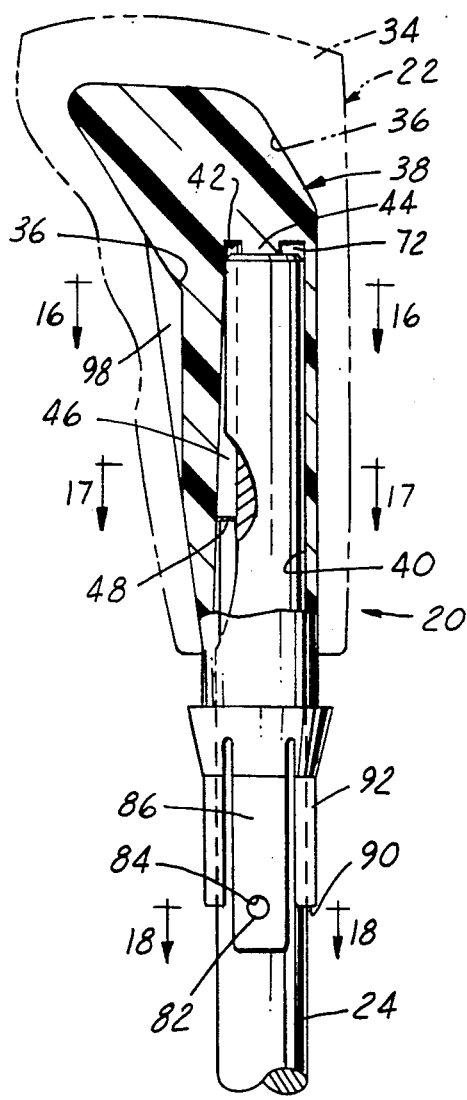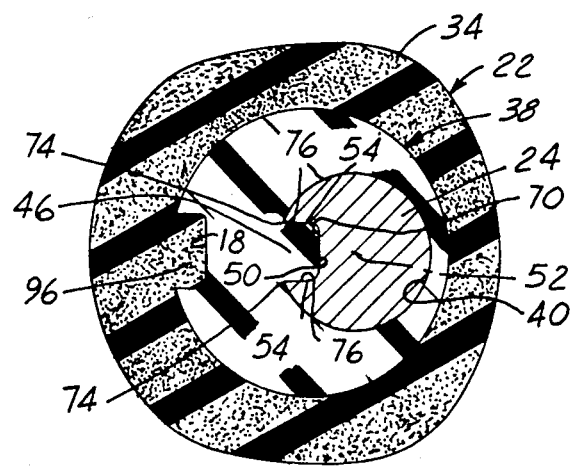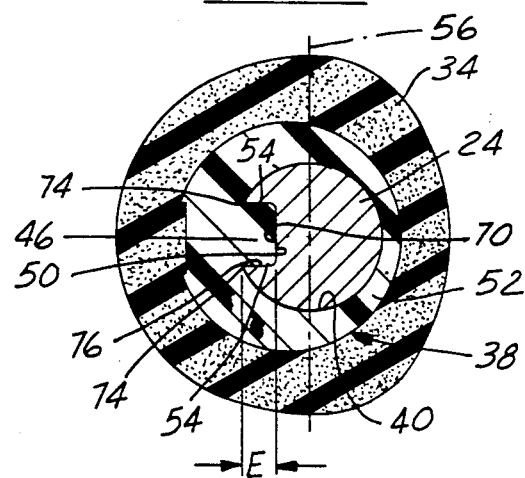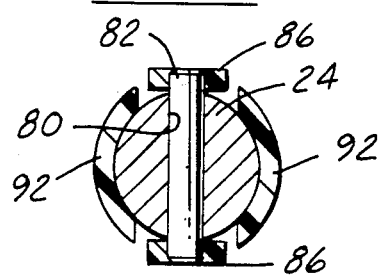

GEARSHIFT KNOB JOINING ARRANGEMENT

BACKGROUND OF THE INVENTION

This invention relates to a shift lever for operating a transmission of automotive vehicles, and more particularly to an improved joining and attaching arrangement for securing a plastic handgrip knob to a gearshift lever rod assembly.

The U.S. Pat. No. 4,598,606 issued July 8, 1986 to Foggini discloses a gearshift control lever for motor vehicles and method for manufacture thereof. The Foggini control lever comprises an integral covering which includes the hand grip knob and protective bellows for the swivel joint. A unitary construction is disclosed providing an integral covering of a moldable polymeric material incorporating both the handgrip knob and the protective bellows. The Foggini patent acknowledges that integral coverings have been produced separately by a molding process and subsequently fitted onto the lever. Such fittings have been attached through snap-action engagement of mutually compatible portions provided at the lower end, and respectively into a retaining insert embedded in the covering of the knob.

The U.S. Pat. No. 4,617,834 issued Oct. 21, 1986, to Foggini discloses another preformed integral coating, including gear shift hand grip knob portion and protective bellows for the lever swivel joint at a vehicle console. The Foggini patent discusses prior art hand grip knobs which are threaded or snap engaged with the lever rod free end.

SUMMARY OF THE INVENTION

It is a primary object of the present invention to provide an automotive transmission metal shift lever rod and plastic handgrip knob which are coupleable by means of a linear tapered plastic key and metal keyway securing arrangement which, upon relative axial travel, acts to tightly wedge the key in the keyway obviating relative rotational movement between the lever rod and the knob.

It is another object of the present invention to provide a plastic handgrip knob and metal gearshift rod assembly as set forth above wherein the rod is formed with a keyway and the handgrip has an axial blind bore molded from an intermediate initial point to its closed blind bore end with a linear key. The keyway external junctures with the rod cylindrical surface are ground to define a pair of linear knife-like sharpened cutting edges. The plastic key has its linear crest or land defining a plane parallel to the principal axis of the blind bore. The junctures of the key sides with the internal surface of the blind bore define a pair of radiused internal fillets each being axially tapered from its initial point, defining the key maximum transverse section, to the bore closed end, defining the key minimum transverse section. The key crest and sides at its initial point are sized to initially align and accept the rod keyway upon the rod free end being slidably inserted in the blind bore.

Upon continued axial force being exerted on the rod toward the bore closed end each keyway sharpened cutting edge acts to deform and cut its associated tapered key fillet thereby tightly wedging and joining the plastic key in the keyway. A raised stop button, molded at the closed end of the blind bore, contacts the free end of the rod upon the key being fully received in the keyway. The stop button defines a concentric doughnut-shaped chamber with the bore closed end so as to receive and capture any particles of plastic fillet material removed by the keyway sharpened cutting edges.

The rod and the handgrip knob are thus joined against relative rotation by the tapered plastic key and metal keyway interlocking arrangement. A pair of axially extending plastic leaf springs are molded integral with the handgrip core member on either side of the blind bore opening. The leaf springs have aligned holes which snap over a transverse crosspin press fitted in a crossbore drilled in the rod thereby axially retaining the handgrip knob core member on the gearshift rod.

BRIEF DESCRIPTION OF THE DRAWINGS

Further features and advantages of the invention will become apparent to those skilled in the art upon reference to the following description and accompanying drawings in which:

FIG. 1 is a perspective view of a portion of a vehicle console box showing the upper portion of the gear shift lever handgrip knob with a bellows seal arranged to protect the lever swivel joint at the console;

FIG. 2 is an exploded perspective view of the gear shift lever rod and hand grip knob of FIG. 1;

FIG. 3 is a top elevational view of the hand grip knob of FIG. 1;

FIG. 4 is a partly sectional side elevational view of the handgrip knob with the section taken on line 4—4 of FIG. 3;

FIG. 5 is a front elevational view of the hand grip knob of FIG. 4;

FIG. 6 is a bottom elevational view of the hand grip knob taken in the direction of arrow 6;

FIG. 7 is a detail front elevational view of the lever rod;

FIG. 7A is a detail side elevational view of the lever rod;

FIGS. 8–14 are vertical sectional views taken on the cross section lines 8–14, respectively, of FIG. 4;

FIG. 15 is a view similar to FIG. 4 showing the lever rod in full lines; and

FIGS. 16, 17 and 18 are horizontal sectional views taken on lines 16—16, 17—17, and 18—18, respectively, of FIG. 15.

DESCRIPTION OF THE PREFERRED EMBODIMENT

Referring now to the drawings, and particularly to FIGS. 1, 2 and 15 there is shown a vehicle gearshift lever arrangement 20 including an operating handgrip knob assembly 22 affixed to the upper free end of a gearshift lever rod 24. A gearshift bellows seal 26 is shown in FIG. 1 for protecting the lever rod articulation joint or connection (not shown). In FIG. 2 it will be seen that the lever rod 24 free end exits a rectangular aperture 28 in upper wall 30 of a vehicle center console 32.

The handgrip knob sub-assembly 22 comprises an outer relatively soft pistol grip-shaped knob member 34 formed with a hollow chamber 36. The outer knob member 34 is adapted to be cast or molded over an inner relatively hard core member generally indicated at 38 in FIG. 15. The outer knob member is formed from suitable soft plastic material such as polyurethane while the inner core member 38 is formed from a suitable hard plastic material such as a fibre glass filled polymeric resin material in the form of Nylon or the like. The inner core member 38 is fixedly secured in the outer knob chamber 36 by suitable adhesive means such as in a co-molding process.

As best seen in FIG. 4, the core member 38 is molded with an axial blind bore 40 having its closed upper end 42 formed with a raised stop button 44. An axially extending linear key 46 is formed in the blind bore 40. The key 46 extends a predetermined distance from an intermediate initial end or lower terminus, at its end face 48, to the key upper terminus at blind bore closed end 42. The key 46 is shown having its raised land face or crest 50 defining a plane which extends parallel with the blind bore principal axis 52.

The linear key is formed with a pair of tapered fillets, generally indicated at 53 in FIG. 6, defining the radiused or arcuate juncture of the blind bore inner cylindrical wall surface with parallel sides 54 of the key 46. The fillets 53 in FIG. 6, are formed with a maximum predetermined chordal dimension at the key initial end 48 and a minimal predetermined chordal dimension at the bore closed end 42. Thus, the chordal distance "A", shown in FIG. 11, is measured from the fillet root portion 53a to the key crest 50. The distance "A" is substantially equal to the maximum lead-in dimension of the key initial end 48.

The key chordal distance "B", shown in FIG. 12, is measured from the fillet root portion 53b to the key crest 50. The fillet root portion 53b is located about half-way between the key initial end 48 and the closed-end 42 of the blind bore 40. The chordal distance "C", shown in FIG. 13, is measured from the fillet root portion 53c to the key crest 50. The key chordal distance "D", shown in FIG. 14, is measured from the fillet root portion 53d to the key crest 50. The fillet root portion 53d is at the bore closed end 42 showing the base of the stop button in cross-section. That is the linear key pair of fillets 53 are uniformly tapered inwardly from a maximum chordal distance "A" at the key initial end or lower terminus 48 to a minimum chordal distance "D" at the bore closed end or upper terminus 42. The fillets 53 are uniformly tapered from their initial key end 48 toward a plane that includes the bore principal axis 52 which plane is indicated by dashed construction line 56 in FIG. 17.

With reference to FIGS. 7 and 7A the metal lever rod 24 is shown formed with a linear keyway 70 extending axially from rod upper free end 72 a minimal distance slightly greater than the axial distance of key 46. The rod keyway 70 has a uniform width "W" with its free end chordal distance "E" (FIGS. 7A and 17) sized to readily receive the key initial end 48 therein after the core member bore 40 telescopically receives the rod 24 therein. It will be noted in FIGS. 16 and 17 that the keyway 70 is formed with a uniform or constant chordal distance "E". Further, the rod 24 has its outer surface ground such that a pair of linear knife-like sharpened cutting edges 74 are formed at the exterior junctures of keyway sides 76 and the cylindrical surface of the rod 24.

With reference to FIGS. 7 and 7A it will be seen that the rod 24 has a crossbore 80 extending therethrough for the reception a metal crosspin 82. The crosspin 82 is sized such that its free ends protrude from the crossbore 80 at its diametrical opposite ends. The crosspin ends are adapted to be received in associated holes 84 adjacent the free ends of a pair of leaf spring fingers 86 molded jointly with the plastic core member. The leaf spring fingers 86, shown in FIGS. 4 and 5, are diametrically opposed with their upper ends formed integrally with collar portion 88 which, in turn, is integral with the core member 38. The leaf spring fingers 86 extend axially downwardly past the lower ends 90 of diametrically opposed arcuate lead-in segments 92 integral with the core member 38. The segments arcuate shape conforms to the rod cylindrical surface , as seen in FIG. 18, thereby providing flexible lead-in guides for the rod.

FIG. 5 shows the spring fingers 86 having their free lower ends provided with integral opposed beveled surfaces 94 adapted to engage the rod free end 72 causing the spring fingers to be urged radially outwardly. Thus, upon the rod contacting the stop button 44 the pair of spring finger holes 84 snappingly engage an associated free end of cross pin 82 to positively retain the handgrip core member 38 on the rod 24 against axial movement.

As viewed in FIG. 15, upon the rod free end 72 entering the blind bore 40 a predetermined axial distance the keyway open end is sized to readily accept the initial end 48 of the linear key 46. Continued driving travel of the rod 24 relative to the blind bore 40 causes the pair of keyway sharpened cutting edges 74 to cut and deform their associated tapered fillets 53. Upon the rod free end abutting against the stop button 44 the sharpened cutting edges 74 progressive interengagement with the tapered fillets 53 act to tightly wedge the key 46 in the keyway 76 in an interference fit manner. As a result the outer knob member 34 and the inner core member 38 are locked against relative rotational movement thereby obviating any manufacturing tolerance conditions that otherwise might result in such relative rotational movement.

It will be noted in FIGS. 5 and 14 that a substantially concentric doughnut-shaped space 94 is defined intermediate the stop button 44 and the closed end of the blind bore 40. The space 94 provides a receptacle to capture any plastic chips or particles resulting from the deforming and cutting of the fillets by the keyway sharpened cutting edges 74.

With reference to FIGS. 15 and 16 it will be seen that the outer handgrip member 34 and the inner core member 38 are shown interlocked by means of integral handgrip key 96 and core member keyway 98. Thus, the members 34 and 38 are mechanically interlocked in addition to being bonded together at their interface by suitable adhesive means.

While only one embodiment of this invention has been described and shown, those skilled in the art will appreciate that other forms may be possible without departing from the scope of the following claims.

What is claimed is:

1. An arrangement for joining a handgrip knob of plastic material to a metal gearshift lever rod comprising:

a metal lever rod having a circular cross-section and formed width a uniform rectangular cross-sectioned linear keyway extending axially from the rod upper free end a predetermined minimal distance, said keyway having opposed parallel sides and a base such that the linear juncture of each said side with said cylindrical surface defining an axially extending sharpened cutting edge;

said handgrip knob in the form of a sub-assembly including an outer hollow plastic grip member enclosing an inner plastic core member, means attaching said inner and outer members together in fixed relation;

said inner core member having an axially extending tubular portion defining a downwardly opening blind bore having a closed end formed with a stop button, said stop button located a predetermined axial distance from said bore opening, said stop button defining a substantially concentric space intermediate said bore closed end and said stop button;

said blind bore formed with a rectangular cross-sectioned linear key extending upwardly a predetermined axial distance from its initial lower terminus, located intermediate the bore open and closed ends, to its upper terminus, located at said bore closed end, said linear key having parallel side portions and a crest defining a plane parallel to the principal axis of said blind bore;

the junctures of each said key side portion with the internal surface of said bore defining an axially extending internal fillet, each said fillet being uniformally tapered from a maximum chordal distance at said key lower terminus to a minimum chordal distance at said key upper terminus;

said key sized at said lower terminus to readily accept and align said rod keyway after said rod upper free end being slidably inserted in said bore, and whereby upon continued axial force being exerted driving said rod toward said bore closed end causing said pair of keyway sharpened cutting edges to deform and cut their associated fillets such that upon said rod free end abutting against said stop button said rod keyway cutting edges and said bore key fillets tightly wedged so as to be locked in an interference fit manner obviating relative rotational movement between said rod and said core member.

2. The joining arrangement as set forth in claim 1, wherein said substantially concentric space intermediate said stop button and said bore closed end operative to receive any particles of plastic material cut from said fillets.

3. The joining arrangement as set forth in claim 1, wherein said core member formed with a pair of integral leaf spring fingers extending axially downwardly from diametrically opposed locations on either side of the bore opening, each said spring leaf finger having an aperture at its lower end adapted to snappingly engage a crosspin free end extending diametrically from said rod.

* * * * *